United States Patent
Huang et al.

(10) Patent No.: US 10,473,407 B2
(45) Date of Patent: Nov. 12, 2019

(54) WATER HEATER HAVING SECONDARY HEAT EXCHANGER

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW); Kuan-Chou Lin, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 145 days.

(21) Appl. No.: 14/521,255

(22) Filed: Oct. 22, 2014

(65) Prior Publication Data

US 2016/0116228 A1    Apr. 28, 2016

(51) Int. Cl.
*F28D 21/00* (2006.01)
*F24H 1/14* (2006.01)
*F24H 9/18* (2006.01)

(52) U.S. Cl.
CPC ......... *F28D 21/0007* (2013.01); *F24H 1/145* (2013.01); *F24H 9/1836* (2013.01)

(58) Field of Classification Search
USPC ..................................... 122/18.2, 32; 165/47
See application file for complete search history.

(56) References Cited

U.S. PATENT DOCUMENTS

| | | | | |
|---|---|---|---|---|
| 2,663,916 A | * | 12/1953 | Millman | F25D 23/082 |
| | | | | 49/484.1 |
| 5,345,924 A | * | 9/1994 | Rieke | F24H 3/105 |
| | | | | 126/110 R |
| 8,662,068 B2 | * | 3/2014 | Ahmed | A47J 37/0704 |
| | | | | 126/220 |
| 2008/0006226 A1 | * | 1/2008 | Takeda | F24H 1/40 |
| | | | | 122/18.1 |
| 2009/0133642 A1 | * | 5/2009 | Asakura | F22D 1/10 |
| | | | | 122/32 |
| 2010/0229804 A1 | * | 9/2010 | Okamoto | F24H 1/145 |
| | | | | 122/18.2 |

(Continued)

*Primary Examiner* — Steven B McAllister
*Assistant Examiner* — John E Bargero
(74) *Attorney, Agent, or Firm* — R. Lynette Wylie; Apex Juris, PLLC.

(57) ABSTRACT

A water heater includes a combustion device, a primary heat exchanger, and a secondary heat exchanger. The combustion device burns gas to generate high-temperature air. The primary and the secondary heat exchangers are provided sequentially above the combustion device. When the high-temperature air passes through the primary heat exchanger, part of thermal energy is absorbed by exchange plates and a water pipe therein. When the high-temperature air continues to pass through the secondary heat exchanger, part of the rest thermal energy is absorbed by a heat tube set therein to preheat water flowing through the heat tube set. The preheated water then flows into the water pipe of the primary heat exchanger. The secondary heat exchanger includes a case and a cover board which detachably seals a bore on the case. Whereby, it is convenient for a user to clean pipes inside the secondary heat exchanger.

6 Claims, 6 Drawing Sheets

(56) References Cited

U.S. PATENT DOCUMENTS

| | | | |
|---|---|---|---|
| 2011/0067650 A1* | 3/2011 | Chung-Chin | F24D 12/02 122/18.2 |
| 2012/0272928 A1* | 11/2012 | Kameyama | F24H 1/28 122/19.2 |
| 2014/0352930 A1* | 12/2014 | Hanks | F28D 1/0461 165/121 |

* cited by examiner

WATER HEATER HAVING SECONDARY HEAT EXCHANGER

BACKGROUND OF THE INVENTION

1. Technical Field

The present invention relates generally to a water heater, and more particularly to a water heater having a secondary heat exchanger.

2. Description of Related Art

A conventional water heater has a burner and a heat exchanger. Gas is supplied to the burned and burned to heat the heat exchanger above the burner. The heat exchanger includes a water pipe and a plurality of exchange plates. The exchange plates are arranged in parallel, and the water pipe repeatedly passes through the exchange plates. The water pipe has an inlet and an outlet. Cold water enters the water pipe via the inlet, and hot water leaves the water pipe via the outlet. The exchange plates are heated by the burner, and the heat is transferred to the water pipe via conduction to heat the water therein. According to the laws of thermodynamics, is heat is not always transferred to the water pipe to heat the heater, therefore, high-temperature gas will be exhausted out of the water heater while heating water. In other words, the conventional water heater has a low efficiency in transfer of thermal energy.

BRIEF SUMMARY OF THE INVENTION

In view of the above, the primary objective of the present invention is to provide a water heater having a secondary heat exchanger, which is able to efficaciously use the thermal energy with high efficiency.

The secondary of the present invention is to provide a water heater having a secondary heat exchanger, which can be readily cleaned the secondary heat exchanger in an easy way.

The secondary of the present invention is to provide a water heater having a secondary heat exchanger, which can clean the secondary heat exchanger in an easy way.

The present invention provides a secondary heat exchanger, which is mounted on a water heater having a primary heat exchanger, including a case having an enter opening, a second exit opening, and a bore, wherein the enter opening is communicated with the primary heat exchanger; a heat tube set received in the case, and having an inlet and an outlet for water entering the heat tube set via the inlet and leaving via the outlet; a cover board detachably connected to the case to seal the bore; and a collecting member received in the case under the heat tube set.

The present invention also provides a water heater, including a combustion device where gas is burned to generate heat; a primary heat exchanger above the combustion device, and having a first case and a water pipe, wherein the first case has a first exit opening, and the water pipe is received in the first case; the water pipe has an inlet and an outlet; and a secondary heat exchanger. The secondary heat exchanger is above the primary heat exchanger, and includes a second case having an enter opening, a second exit opening, and a bore, wherein the enter opening is communicated with the first exit opening of the primary heat exchanger; a heat tube set received in the case, and having an inlet and an outlet for water entering the heat tube set via the inlet and leaving via the outlet; a cover board detachably connected to the case to seal the bore; and a collecting member received in the case under the heat tube set.

With the design of above, water will be heated twice in the water heater to increase the heat transfer efficiency. The present invention also provides the cover board, which facilitates cleaning the secondary heat exchanger.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
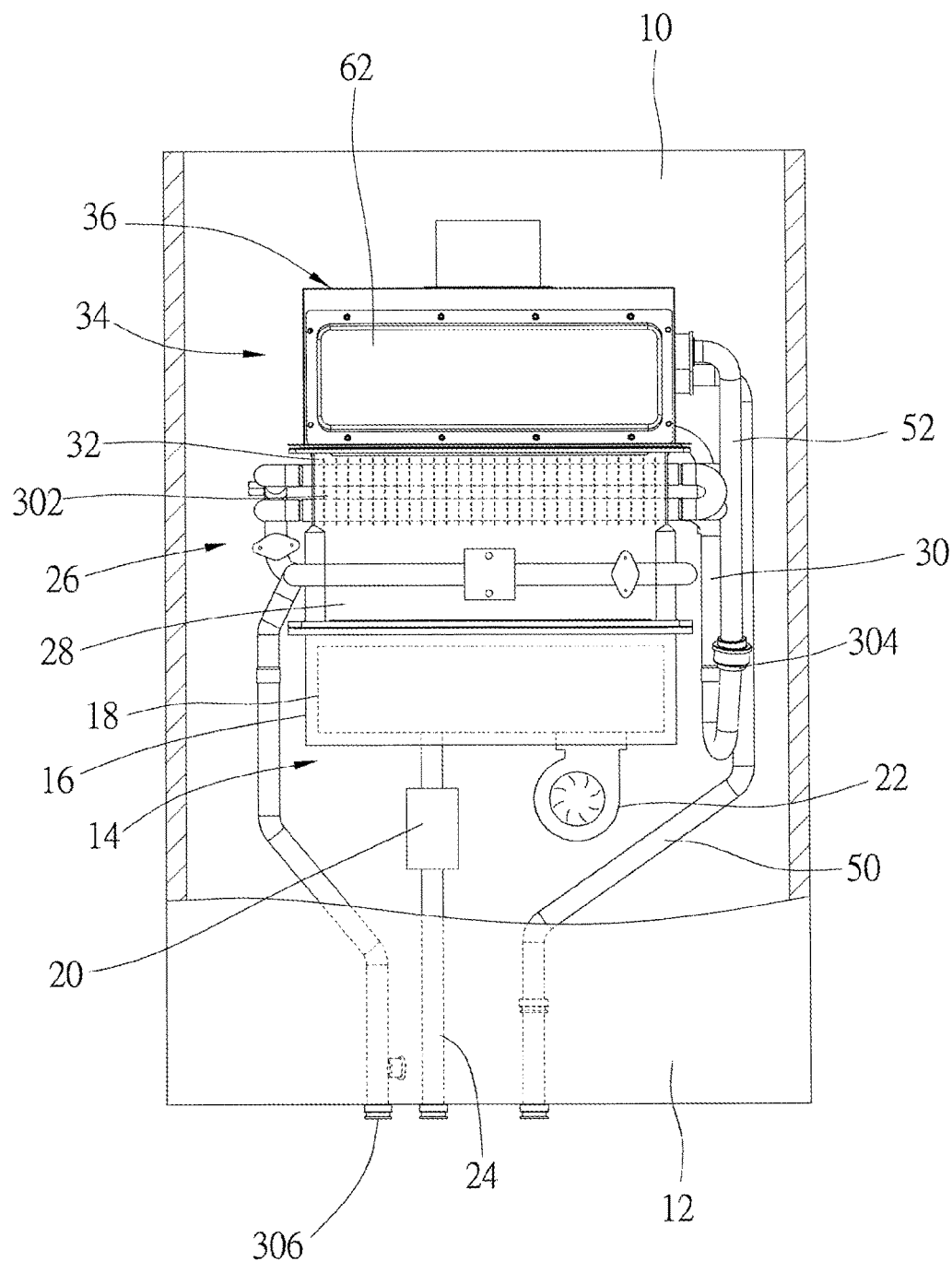
FIG. 1 is a schematic diagram of the water heater of a preferred embodiment of the present invention.
Figure 2:
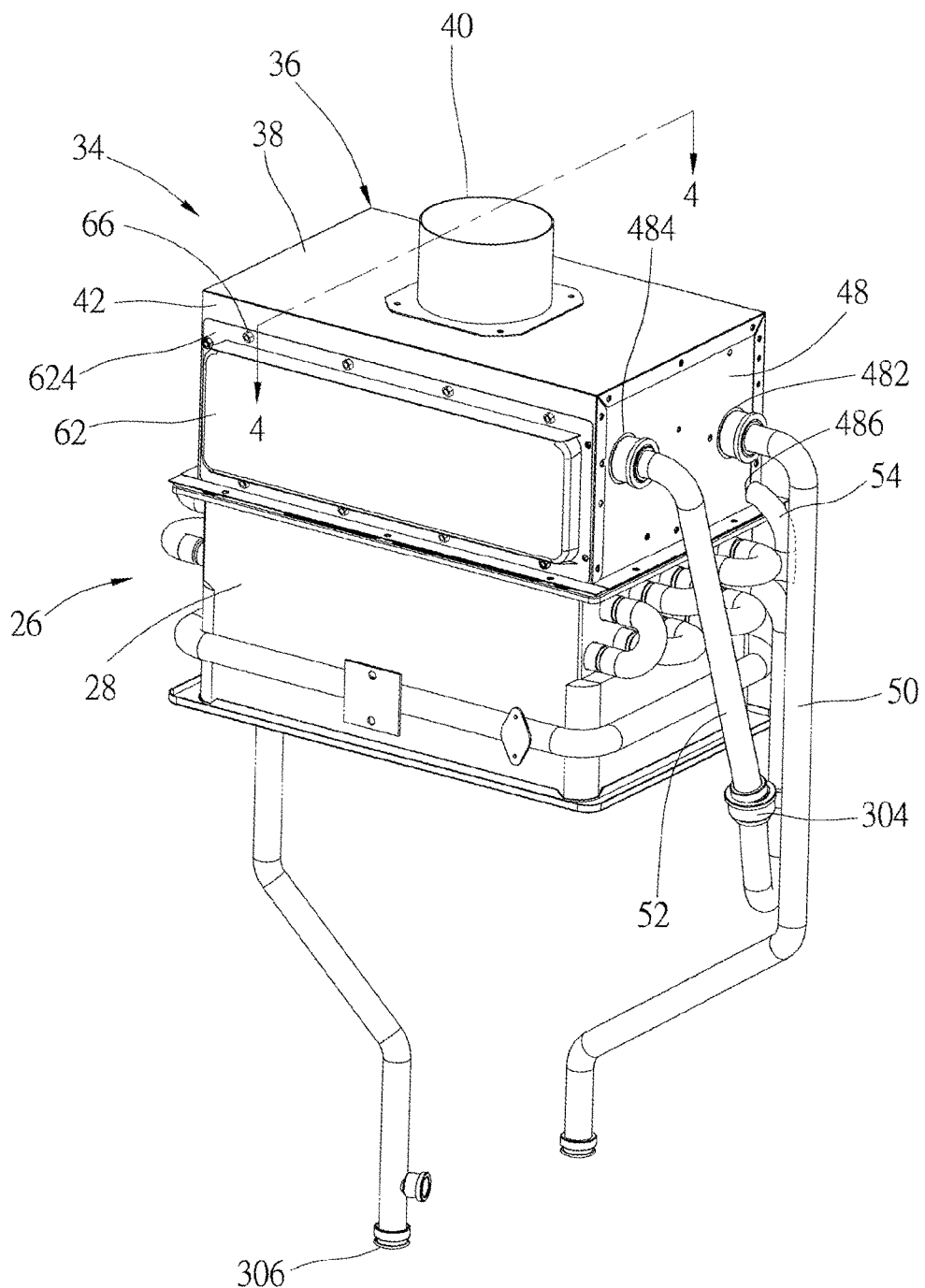
FIG. 2 is a perspective view of the secondary heat exchanger of the preferred embodiment of the present invention.
Figure 3:
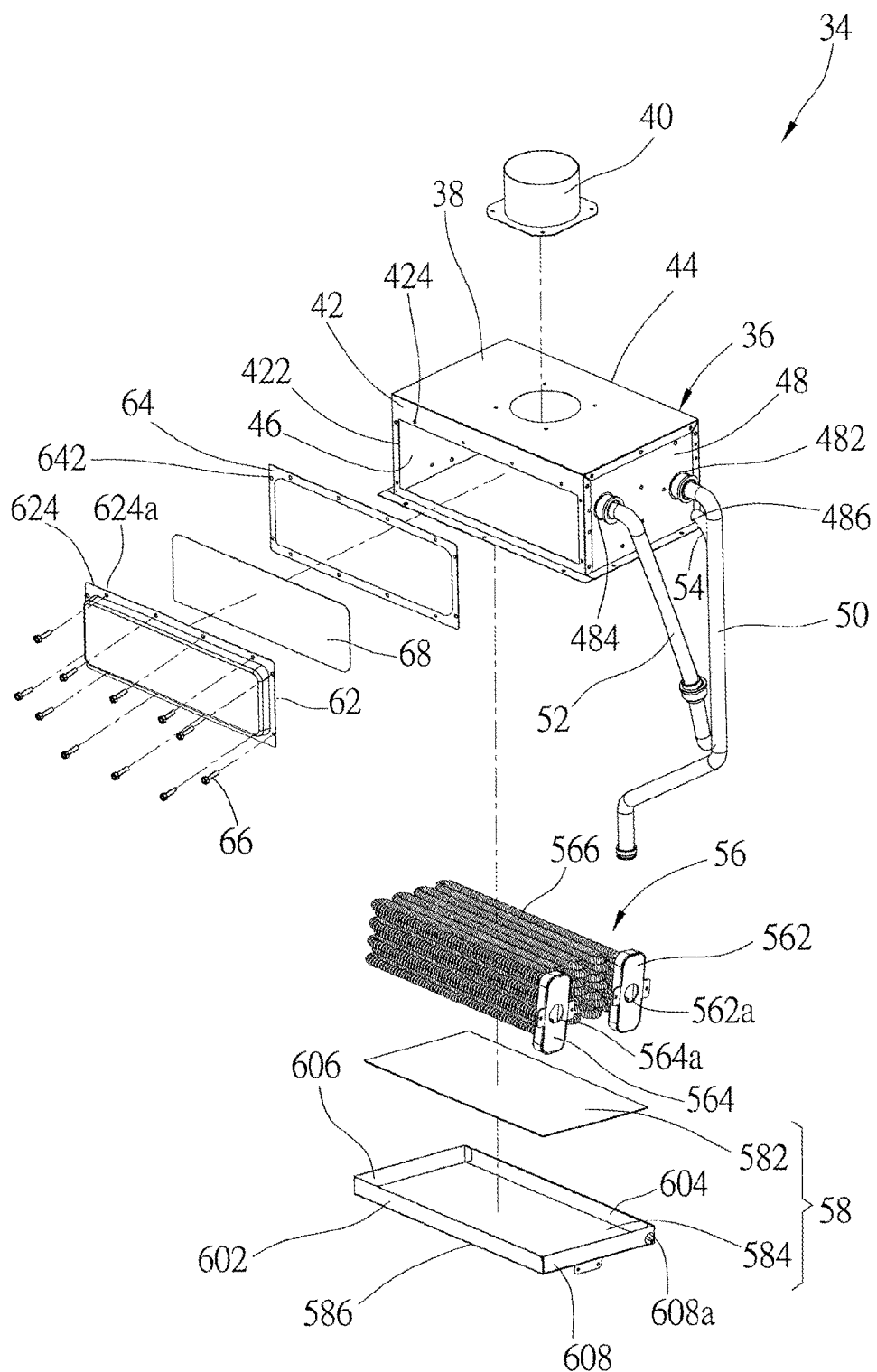
FIG. 3 is an exploded view of the secondary heat exchanger of the preferred embodiment of the present invention.
Figure 4:
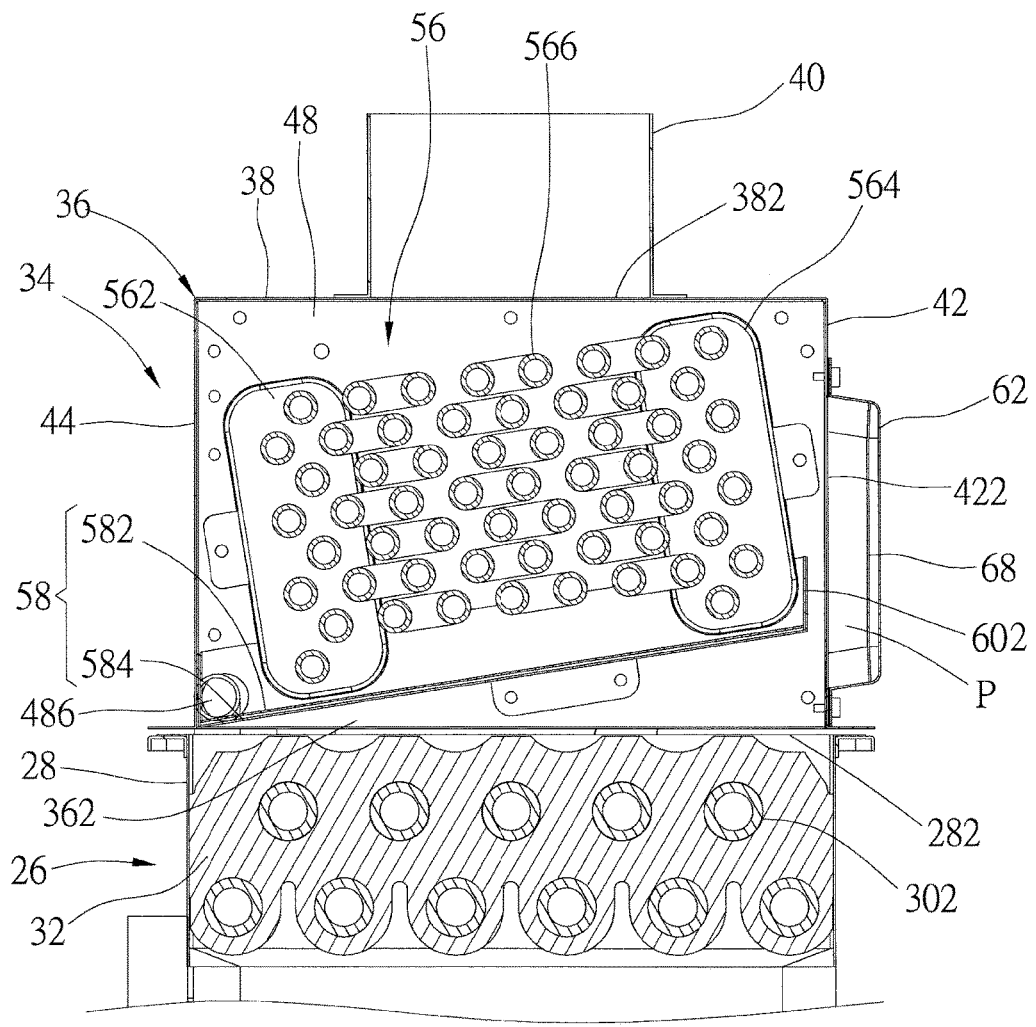
FIG. 4 is a sectional view along the 4-4 line of FIG. 2.
Figure 5:
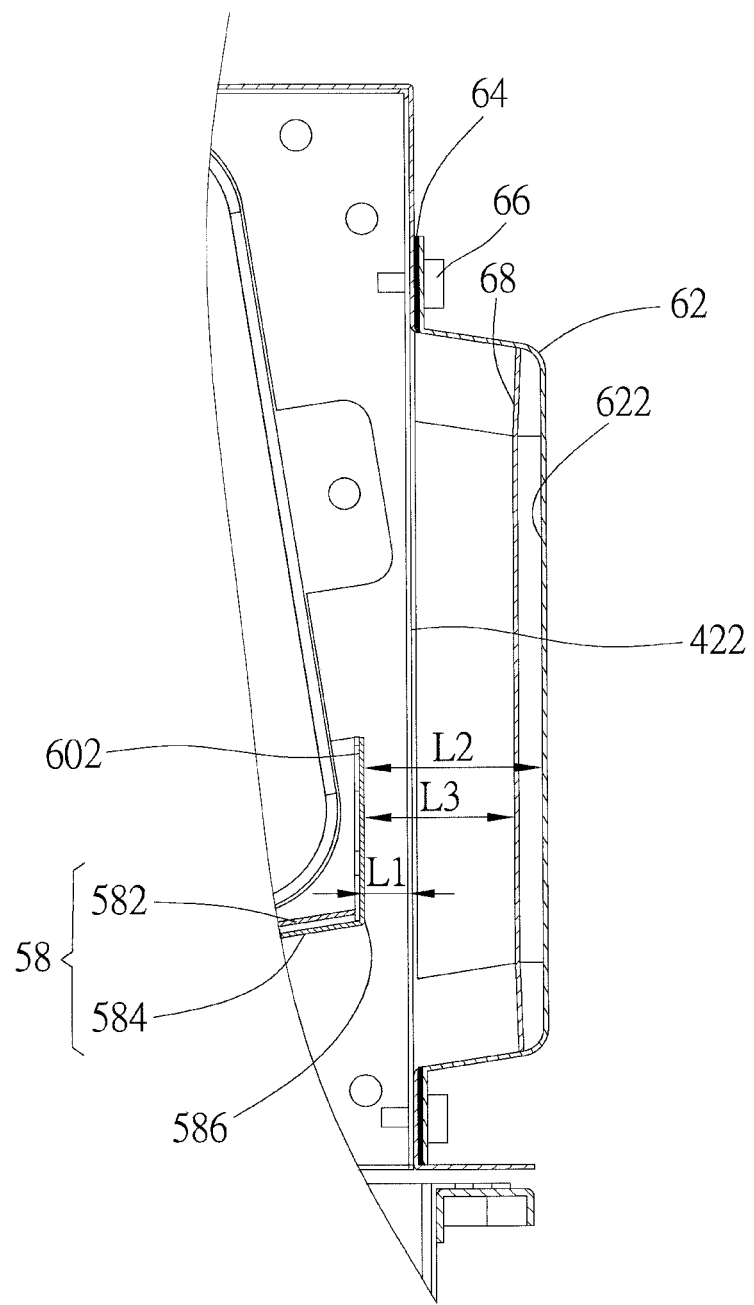
FIG. 5 is a partial sectional view of the secondary heat exchanger of the preferred embodiment of the present invention.
Figure 6:
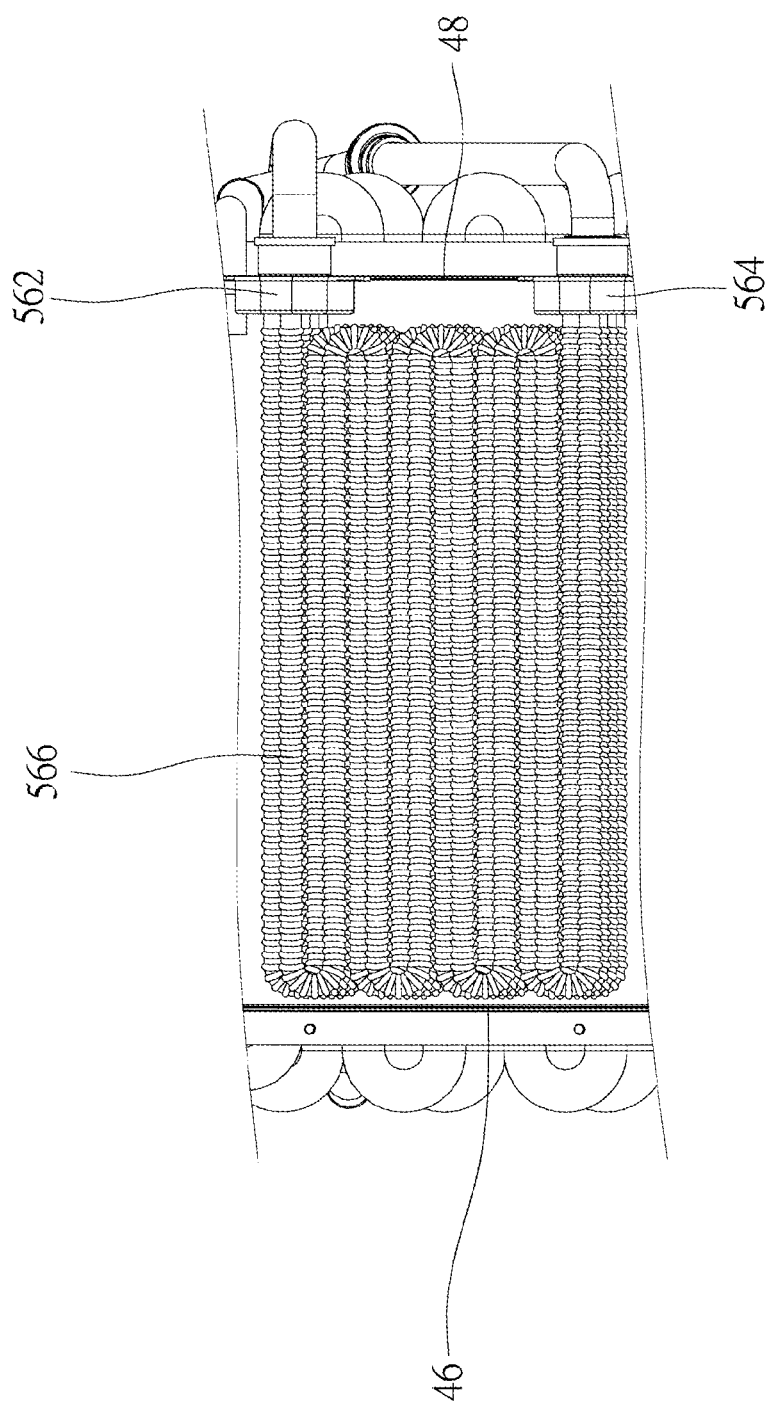
FIG. 6 is a partial top view of inside of the secondary heat exchanger of the preferred embodiment of the present invention.

As shown in FIG. 1, a water heater of the preferred embodiment of the present invention includes a base 10, a main case 12, a combustion device 14, a primary heat exchanger 26, and a secondary heat exchanger 34. The combustion device 14, the primary heat exchanger 26, and the secondary heat exchanger 34 are mounted on the base 10, and the main case 12 is detachably connected to the base 10 to receive these elements therein.

The combustion device 14 has a housing 16, a burner 18, a gas valve 20, and a blower 22. The housing 16 has an opening at a top thereof, and the burner 18 is received in the housing 16 and under the opening. Gas is burned in the burner 18 to generate high-temperature air coming out via the opening of the housing 16. The gas valve 20 is provided on a gas pipe 24. The gas pipe 24 provides gas to the burner 18, and the gas valve 20 is operated to adjust a gas flow in the gas pipe 24. The blower 22 supplies the burner 18 with an air flow to be mixed with the gas from the gas pipe 24. The gas valve 20 and the blower 22 are controllable by a controller (not shown) to change the gas flow and the air flow to the burner 18. Therefore, gas and air are mixed in a desired air-fuel ratio.

As shown in FIG. 2 to FIG. 6, the primary heat exchanger 26 includes a first case 28, a water pipe 30, and exchange plates 32. The first case 28 is connected to the top of the case 16, and the opening of the case 16 is communicate with inside of the first case 28. In other words, the first case 28 has an opening at a bottom, which is attached to the top of the case 16. The first case 28 has a first exit opening 282 at a top thereof. The water pipe 30 is a continuous U-shaped pipe mounted in the first case 28. The water pipe 30 has several straight heating sections 302 in the first case 28 and several U-turn sections left out of the first case 28. Opposite ends of the water pipe 30 extend out of the first case 28, one of which is provided with a connector 304, and the other of which is a water outlet 306. The exchange plates 32 are parallel to each other and received in the first case 28, and the heating sections 302 of the water pipe 30 pass through the exchange plates 32.

The secondary heat exchanger 34 is mounted on the top of the primary heat exchanger 26, and has a second case 36, a heat tube set 56, a collecting member 58, and a cover board 62.

The second case 36 has a plate 38 at a top thereof, on which a second exit opening 382 is provided. An exhausting pipe 40 is connected to the second exit opening 382. The second case 36 has an enter opening 362 at a bottom thereof, which is communicated with the first exit opening 282 of the first case 28 of the primary heat exchanger 26. The second case 36 further has four sidewalls, which are called a front board 42, a rear board 44, a left board 46, and a right board 48. The front board 42 has a bore 422 and a plurality of threaded holes 424 around the bore 422. The front board 42 faces the main case 12, and the rear board 44 faces the base 10. The right board 48 is provided with a first bore 482 and a second bore 484. A water input tube 50 is inserted into the first bore 482, and a connecting tube 52 is inserted into the second bore 484. The water input tube 50 extends out of the main case 12 for water flowing into the water heater. The right board 48 is provided with an exhausting bore 486 for a water exhausting tube 54 passing through.

The heat tube set 56 is received in the second case 36 in an inclined condition, and includes an input box 562, an output box 564, and a plurality of continuous S-shaped tubes 566. The input box 562 is lower than the output box 564. The input box 562 is provided with an inlet 562a, and the inlet 562a is aligned with the first bore 482 of the second case 36 for the input tube 50 passing therethrough. The output box 564 is provided with an outlet 564a, and the outlet 564a is aligned with the second bore 484 of the second case 36 for the connecting tube 52 passing through. The connecting tube 52 is connected to the connector 304 of the water pipe 30. All the tubes 566 have opposite ends connected to the input box 562 and the output box 564 respectively. The tubes 566 are staggered to expose surfaces thereof as possible. Water from the input tube 50 flows into the input box 562, and then flows through the tubes 566, the output box 564, and the connecting tube 52 before enters the water pipe 30 of the primary heat exchanger 26.

The collecting member 58 is received in the second case 36 under the heat tube set 56, and has a top board 582 and a low board 584. The top board 582 is stacked on the low board 584, and kept a distance from it, therefore a space is formed between the top board 582 and the low board 584.

The collecting member 58 is provided with four walls 602, 604, 606, 608 at four sides thereof. The walls 606, 608 at left and right sides abut against the rear board 44, the left board 46, and the right board 48 of the second case 36. The collecting member 58 has a front edge 586 facing the front board 42 of the second case 36. The front edge 586 faces the bore 422, and keeps a first distance L1 from the front board 42 in a horizontal direction. The same as the heat tube set 56, the collecting member 58 is inclined while the wall 606 is lower than the wall 608. The collecting member 58 is provided with a round bore 608a on the wall 608 of the right side, and the round bore 608a is aligned with the exhausting bore 486 of the right board 48 to drain the water in the collecting member 58 out of the second case 36 through the round bore 608a and the exhausting bore 486. Water will be collected in the collecting member 58 because of the walls 602-608. The space between the top and the low boards 582, 584 to avoid vapor from condensation.

The cover board 62 is beside the front board 42, and has a flange 624 at a periphery thereof. The flange 624 is provided with several holes 424a, and the front board 42 is provided with several threaded holes 424, so that the cover board 62 is fixed to the front board 42 of the second case 36 by bolts 66. A gasket 64 is provided between the flange 624 and the front board 42. The gasket 64 also has several holes 642 for the bolts 66. As a result, the bore 422 of the front board 42 is sealed by the cover board 62.

The cover board 62 has an inner side 622 facing the front board 42. The inner side 622 of the cover board 62 keeps a second distance L2 from the front edge 586 of the collecting member 58 in the horizontal direction, and the second distance L2 is longer than the first distance L1. A separating board 68 is connected to the cover board 62, and keeps a distance from the inner side 622 of the cover board 62. The separating board 68 keeps a third distance L3 from the front edge 586 of the collecting member 58 in the horizontal direction to form a passageway P. The third distance L3 is shorter than the second distance L2, but longer than the first distance L1. In other words, the cover board 62 has a room therein to provide a space (the passageway P) in the second case 36 for high-temperature air passing through.

When gas is burned in the burner 18 and generates high-temperature flue gas, also referred to herein as high-temperature air, goes up to the first case 28 of the primary heat exchanger 26, and heats the exchange plates 32. After that, the high-temperature air keeps going up to the second case 36 of the secondary heat exchanger 32. In the second case 26 the high-temperature air goes through the passageway P and to the S-shaped tubes 566, and then goes out of the second case 36 via the second exit opening 382. As a result, cold water is heated in the S-shaped tubes 566 of the secondary heat exchanger 32, and then is heated in the water pipe 30 in the primary heat exchanger 26 again, therefore the heat transfer efficiency in the water heater of the present invention is higher than the conventional water heater having single heat exchanger.

In addition, burning in the burner 18 generates carbon dioxide, and carbon dioxide is reacted with vapor to form carbonic acid solution. The carbonic acid solution will be collected in the collecting member 58, and drained out of the water heater via the exhausting bore 486 to prevent the elements in the water heater from being corroded by the carbonic acid solution.

The cover board 62 is able to be taken off from the second case 36 to allow user to clean the S-shaped tubes 566 after the main case 12 is removed. When cleaning the S-shaped tubes 566, the user may put a board (not shown) on the wall 602 of the collecting member 58 and extends out of the bore 422, so that the waste cleaning water may be guided out of the water heater via the exhausting bore 486 instead of flowing into the first case 28.

In conclusion, the water heater of the present invention make the water be heated twice with one burner to increase the heat transfer efficiency. The present invention also provides the cover board 62, which is helpful to the user to clean the S-shaped tubes 566 of the secondary heat exchanger 32, and the collecting member to drain the carbonic acid solution out of the water heater.

It must be pointed out that the embodiments described above are only some preferred embodiments of the present invention. All equivalent structures which employ the concepts disclosed in this specification and the appended claims should fall within the scope of the present invention.

What is claimed is:

1. A secondary heat exchanger, which is mounted on a water heater having a primary heat exchanger and is adapted for performing heat exchange between water and a high-temperature flue gas, wherein the primary heat exchanger has a first exit opening, comprising: a case having an enter opening, a second exit opening, and a bore, wherein the enter opening is communicated with the first exit opening of the primary heat exchanger; a heat tube set received in the case, and having an inlet and an outlet for water entering the heat tube set via the inlet and leaving via the outlet; a cover board detachably connected to the case to seal the bore; and a collecting member received in the case under the heat tube set; wherein the case has a plate at a top thereof and a board; the second exit opening is provided on the plate, and the bore is provided on the board; the cover board is detachably provided on the board to seal the bore; and the bore exposes the heat tube set; wherein the collecting member has a top board and a low board; the top board is stacked on the low board, and a space is formed between the top board and the low board; wherein the case has a plate at a top thereof; the cover board has an inner side; the collecting member has a front edge; a first distance is formed between the front edge of the collecting member and the board, and a second distance is formed between the front edge of the collecting member and the inner side of the cover board; the second distance is longer than the first distance; wherein the cover board protrudes relative to an outer surface of the board of the case to form a protruding portion, whereby to increase a space to be passed through by the high-temperature flue gas, and wherein the cover board has a flange, which surrounds the protruding portion and is detachably engaged with the board of the case; the secondary heat exchanger further comprises a separating board connected to the inner side of the cover board to be located in the protruding portion, and an interval is formed between the separating board and the cover board, wherein the interval does not communicate with the space to be passed through by the high-temperature flue gas such that the high-temperature flue gas does not enter the interval and can only be in contact with an inner surface of the separating board facing the collecting member; a third distance is formed between the front edge of the collecting member and the separating board, and the third distance is shorter than the second distance, but longer than the first distance to thereby guide the high-temperature flue gas flow generally upwardly through the space including the first distance and the third distance.

2. The secondary heat exchanger of claim 1, wherein the case further has a board, which is connected to the plate, and has an exhausting bore; the collecting member is inclined as a whole related to a horizontal direction, and the exhausting bore is at a low side of the collecting member, whereby water on the collecting member flows to the low side and flow out of the case through the exhausting bore; and wherein the heat tube set is in an inclined position.

3. The secondary heat exchanger of claim 1, further comprising a gasket between the cover board and the case and surrounding the bore.

4. A water heater, comprising: a combustion device where gas is burned to generate heat; a primary heat exchanger above the combustion device, and having a first case and a water pipe, wherein the first case has a first exit opening, and the water pipe is received in the first case; the water pipe has an inlet and an outlet; and a secondary heat exchanger above the primary heat exchanger, which is adapted for performing heat exchange between water and a high-temperature flue gas, and includes a second case having an enter opening, a second exit opening, and a bore, wherein the enter opening is communicated with the first exit opening of the primary heat exchanger; a heat tube set received in the case, and having an inlet and an outlet for water entering the heat tube set via the inlet and leaving via the outlet; a cover board detachably connected to the case to seal the bore; and a collecting member received in the case under the heat tube set; wherein the second case of the secondary heat exchanger has a plate at a top thereof and a board; the second exit opening is provided on the plate, and the bore is provided on the board; the cover board is detachably provided on the board to seal the bore; and the bore exposes the heat tube set wherein the collecting member has a top board and a low board; the top board is stacked on the low board, and a space is formed between the top board and the low board; wherein the water heater comprises a base and a main case, and the secondary heat exchanger is mounted on the base; the main case is detachably connected to the base; the cover board has an inner side; the collecting member has a front edge; such that a first distance is formed between the front edge of the collecting member and the board, and a second distance is formed between the front edge of the collecting member and the inner side of the cover board; and the second distance is longer than the first distance; wherein the cover board protrudes relative to an outer surface of the board of the second case, whereby to increase a space to be passed through by the high-temperature flue gas; the secondary heat exchanger further has a separating board connected to the inner side of the cover board, and an interval is formed between the separating board and the cover board, wherein the interval does not communicate with the space to be passed through by the high-temperature flue gas such that the high-temperature air does not enter the interval and can only be in contact with an inner surface of the separating board facing the collecting member; a third distance is formed between the front edge of the collecting member and the separating board, and the third distance is shorter than the second distance, but longer than the first distance to thereby guide the high-temperature flue gas flow generally upwardly through the space including the first distance and the third distance.

5. The water heater of claim 4, wherein the second case of the secondary heat exchanger further has a board, which is connected to the plate, and has an exhausting bore; the collecting member is inclined as a whole related to a horizontal direction, and the exhausting bore is at a low side of the collecting member, whereby water on the collecting member flows to the low side and flow out of the second case through the exhausting bore; wherein the heat tube set is in an inclined condition.

6. The water heater of claim 4, wherein the secondary heat exchanger further has a gasket between the cover board and the second case and surrounding the bore.

* * * * *